US012641548B2

(12) United States Patent
Chen et al.

(10) Patent No.: US 12,641,548 B2
(45) Date of Patent: May 26, 2026

(54) METHOD AND DEVICE FOR POWER CONTROL SIGNALING

(71) Applicant: Apogee 5G Global, LLC, Plano, TX (US)

(72) Inventors: Yu Chen, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 259 days.

(21) Appl. No.: 18/224,068

(22) Filed: Jul. 20, 2023

(65) Prior Publication Data

US 2024/0049147 A1 Feb. 8, 2024

(30) Foreign Application Priority Data

Aug. 3, 2022 (CN) .......................... 202210926013.6

(51) Int. Cl.
*H04W 52/32* (2009.01)
*H04W 52/24* (2009.01)

(52) U.S. Cl.
CPC ....... *H04W 52/325* (2013.01); *H04W 52/242* (2013.01)

(58) Field of Classification Search
CPC . H04W 52/146; H04W 52/242; H04W 72/23; H04W 52/325; H04W 52/365; H04W 52/50; H04W 52/54; H04W 52/42; H04W 24/08; H04W 80/02; H04W 76/27; H04W 52/383; H04W 52/40; H04W 72/21; H04W 74/0833; H04W 72/046; H04W 72/0473; H04W 74/0838; H04W 24/10; H04W 52/367; H04W 72/04; H04W 52/34; H04W 16/28; H04W 52/0212; H04W 52/10; H04W 52/16; H04W 52/248; H04W 52/38; H04W 76/18

See application file for complete search history.

(56) References Cited

U.S. PATENT DOCUMENTS

| | | | | |
|---|---|---|---|---|
| 2014/0029458 | A1 * | 1/2014 | Ye | H04L 5/0035 |
| | | | | 370/252 |
| 2014/0162717 | A1 * | 6/2014 | Liu | H04W 52/40 |
| | | | | 455/522 |
| 2016/0112177 | A1 * | 4/2016 | Zheng | H04L 5/0048 |
| | | | | 370/330 |

(Continued)

OTHER PUBLICATIONS

Third Generation Partnership Project, "Technical Specification Group Radio Access Network; NR; Physical channels and modulation (Release 17)," 3GPP TS 38.211 V17.2.0 (Jun. 2022).

(Continued)

*Primary Examiner* — Golam Sorowar
(74) *Attorney, Agent, or Firm* — Volpe Koenig

(57) ABSTRACT

The present application discloses a method and a device for wireless communications, including: receiving a first signaling; and as a response to receiving the first signaling, resetting a first power control adjustment state to 0; and transmitting a first radio signal with a first power; herein, the first signaling is a physical layer signaling, or the first signaling is a MAC layer signaling; the first signaling is used to indicate a first RS resource group; the first power control adjustment state is used for calculating the first power. The present application can be more energy-saving through indication of the first signaling.

20 Claims, 3 Drawing Sheets

(56) References Cited

U.S. PATENT DOCUMENTS

| | | | | |
|---|---|---|---|---|
| 2019/0132824 | A1* | 5/2019 | Jeon | H04L 5/0098 |
| 2019/0207705 | A1* | 7/2019 | Zhou | H04L 1/0026 |
| 2020/0280933 | A1* | 9/2020 | Liu | H04W 52/365 |
| 2020/0314763 | A1* | 10/2020 | Cheng | H04W 52/146 |
| 2021/0399861 | A1* | 12/2021 | Hao | H04L 5/0078 |

OTHER PUBLICATIONS

Third Generation Partnership Project, "Technical Specification Group Radio Access Network; NR; Multiplexing and channel coding (Release 17)," 3GPP TS 38.212 V17.2.0 (Jun. 2022).

Third Generation Partnership Project, "Technical Specification Group Radio Access Network; NR; Physical layer procedures for control (Release 17)," 3GPP TS 38.213 V17.2.0 (Jun. 2022).

Third Generation Partnership Project, "Technical Specification Group Radio Access Network; NR; Physical layer procedures for data (Release 17)," 3GPP TS 38.214 V17.2.0 (Jun. 2022).

Third Generation Partnership Project, "Technical Specification Group Radio Access Network; NR; Medium Access Control (MAC) protocol specification (Release 17)," 3GPP TS 38.321 V17.1.0 (Jun. 2022).

Third Generation Partnership Project, "Technical Specification Group Radio Access Network; NR; Radio Resource Control (RRC) protocol specification (Release 17)," 3GPP TS 38.331 V17.1.0 (Jun. 2022).

* cited by examiner

100

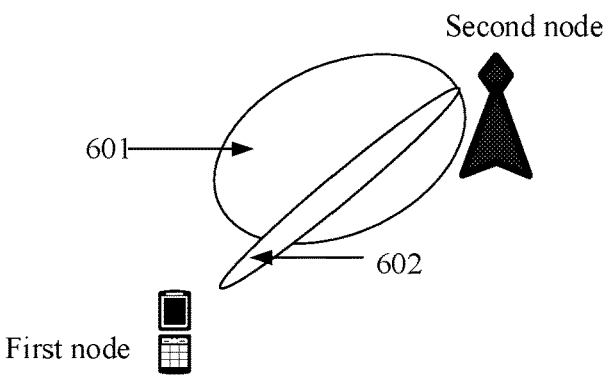
FIG. 6
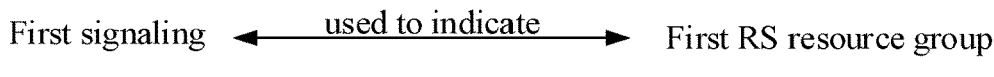
First signaling  ←— used to indicate —→  First RS resource group
FIG. 7
First power control adjustment state  ←— used to calculate —→  First power
FIG. 8
Measurement on first RS resource group  ←— used to calculate —→  Pathloss
FIG. 9
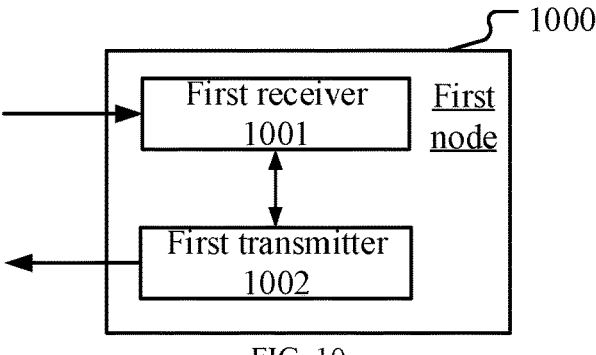
FIG. 10
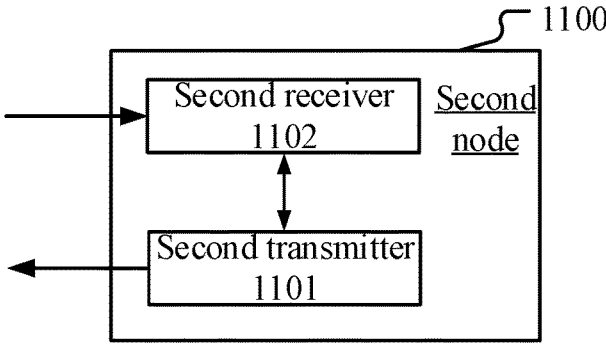
FIG. 11

METHOD AND DEVICE FOR POWER CONTROL SIGNALING

CROSS REFERENCE TO RELATED APPLICATIONS

This application claims the priority benefit of Chinese Patent Application No. 202210926013.6, filed on Aug. 3, 2022, the full disclosure of which is incorporated herein by reference.

BACKGROUND

Technical Field

The present application relates to transmission methods and devices in wireless communication systems, which concern the power control, and in particular to power conservation.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

The 3GPP standardization organization has worked on 5G standardization to formulate a series of specifications, of which the details can refer to:

The power control is a very important topic for discussions in communication systems.

https://www.3gpp.org/ftp/Specs/archive/38_series/38.213/38213-h00.zip https://www.3gpp.org/ftp/Specs/archive/38_series/38.331/38331-h00.zip

SUMMARY

The subject of the latest studies of the 3GPP relates to the issue of power conservation, and in particular to power conservation at the base station side. After the base station reduces its power, the subject further relates to switching off the transmitting of part of reference signals. This will affect measurements performed based on these reference signals, for instance a channel state information (CSI) report made according to these measurements. The base station can also indicate a new reference signal for measurements, or make a change to a Quasi-co-location (QCL) relationship of reference signals, that is, to change a spatial relation of the reference signals. Different configurations may have respective influences over measurements of reference signals that have QCL relations with these signals. There have been multiple QCL relations defined by previous studies, and these QCL relations concern signal reception, transmission and measurement. Any change made to the QCL relation of a reference signal or a suspense of the transmission of part of reference signals will have an impact on the uplink power control for that the uplink power control currently uses a very complex control mechanism, in other words, the uplink power control is related to downlink reference signals. The switch off of partial reference signals, or the change of the spatial relation of some reference signals, will have some impact on the UE communications; to reduce the influence on the UE's performance to the greatest extent, a physical layer or MAC layer signaling can be used to help with fast control, which can hardly be achieved in a dynamic way with the existing techniques. Using higher layers like an RRC signaling for control can generally configure parameters comprehensively, but using the physical layer for dynamic control can only support simple indications due to the consideration of overheads. But this practice will influence the power control. The power adjustment state of power control can be controlled by means of accumulation, but indicating reference signals via a physical layer signaling will lead to errors in subsequent accumulations, which will further mess with the transmit power and even cause traffic interruptions. Hence the issue that remains to be solved by the present application is how to avoid transmission errors in power control when using a physical layer or MAC layer signaling for controlling reference signals.

To address the problem presented above, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict. Besides, the method proposed in the present application can also be used for addressing other issues confronting communications.

The present application provides a method in a first node for wireless communications, comprising:

receiving a first signaling; and as a response to receiving the first signaling, resetting a first power control adjustment state to 0; and transmitting a first radio signal with a first power;

herein, the first signaling is a physical layer signaling, or the first signaling is a MAC layer signaling; the first signaling is used to indicate a first RS resource group; the first power control adjustment state is used for calculating the first power.

In one embodiment, a problem to be solved in the present application includes: how to provide support to power control, dynamically adjusting reference signals, and energy-saving efforts, and how to perform signal measurements and report results of channel measurements.

In one embodiment, an advantage of the above method includes: being energy-saving and very flexible, reducing power consumption of the base station, supporting more flexible and dynamic reference signal adjustments, and providing a more precise power control, thus preventing communication failure and guaranteeing the QoS.

Specifically, according to one aspect of the present application, as a response to receiving the first signaling, performing a measurement on the first RS resource group.

Specifically, according to one aspect of the present application, as a response to receiving the first signaling, stopping performing a measurement on the first RS resource group.

Specifically, according to one aspect of the present application, as a response to receiving the first signaling, performing a measurement on the first RS resource group based on a first QCL parameter;

herein, before receiving the first signaling, the measurement performed on the first RS resource group is based on a second QCL parameter.

Specifically, according to one aspect of the present application, a measurement on the first RS resource group is used for calculating a pathloss.

Specifically, according to one aspect of the present application, transmitting a second signal, the second signal being used for an acknowledgement of the first signaling;

herein, the second signal is unicast; the first signaling is non-unicast.

Specifically, according to one aspect of the present application, the first signaling is used to determine that a number of power control adjustment state(s) is 1; the first signaling is a physical layer signaling;

herein, before receiving the first signaling, the number of the power control adjustment state(s) is greater than 1; the number of the power control adjustment state(s) being 1 is used for resetting the first power control adjustment state to 0.

Specifically, according to one aspect of the present application, as a response to receiving the first signaling, transmitting a first MAC CE; the first MAC CE is used for reporting a power headroom.

Specifically, according to one aspect of the present application, the first node is a terminal of Internet of Things (IoT).

Specifically, according to one aspect of the present application, the first node is a UE.

Specifically, according to one aspect of the present application, the first node is a relay.

Specifically, according to one aspect of the present application, the first node is an access-network device.

Specifically, according to one aspect of the present application, the first node is a vehicle-mounted terminal.

Specifically, according to one aspect of the present application, the first node is an aircraft.

Specifically, according to one aspect of the present application, the first node is a cellphone.

The present application provides a method in a second node for wireless communications, comprising:

transmitting a first signaling; and receiving a first radio signal;

herein, the first signaling is a physical layer signaling, or the first signaling is a MAC layer signaling; the first signaling is used to indicate a first RS resource group; the first power control adjustment state is used for calculating the first power; a transmit (Tx) power of the first radio signal is a first power; the first signaling is used for triggering a reset of the first power control adjustment state to 0.

Specifically, according to one aspect of the present application, a measurement on the first RS resource group is used for calculating a pathloss.

Specifically, according to one aspect of the present application, receiving a second signal, the second signal being used for an acknowledgement of the first signaling;

herein, the second signal is unicast; the first signaling is non-unicast.

Specifically, according to one aspect of the present application, the first signaling is used to determine that a number of power control adjustment state(s) is 1; the first signaling is a physical layer signaling;

herein, before receiving the first signaling, the number of the power control adjustment state(s) of a receiver of the first signaling is greater than 1; the number of the power control adjustment state(s) being 1 is used for resetting the first power control adjustment state to 0.

Specifically, according to one aspect of the present application, receiving a first MAC CE; the first MAC CE is used for reporting a power headroom.

Specifically, according to one aspect of the present application, the second node is a network device.

Specifically, according to one aspect of the present application, the second node is a base station.

Specifically, according to one aspect of the present application, the second node is a relay.

Specifically, according to one aspect of the present application, the second node is an access-point.

Specifically, according to one aspect of the present application, the second node is an aircraft.

Specifically, according to one aspect of the present application, the second node is a satellite.

The present application provides a first node for wireless communications, comprising:

a first receiver, receiving a first signaling; and as a response to receiving the first signaling, resetting a first power control adjustment state to 0; and a first transmitter, transmitting a first radio signal with a first power;

herein, the first signaling is a physical layer signaling, or the first signaling is a MAC layer signaling; the first signaling is used to indicate a first RS resource group; the first power control adjustment state is used for calculating the first power.

The present application provides a second node for wireless communications, comprising:

a second transmitter, transmitting a first signaling; and a second receiver, receiving a first radio signal;

herein, the first signaling is a physical layer signaling, or the first signaling is a MAC layer signaling; the first signaling is used to indicate a first RS resource group;

the first power control adjustment state is used for calculating the first power; a transmit (Tx) power of the first radio signal is a first power; the first signaling is used for triggering a reset of the first power control adjustment state to 0.

In one embodiment, compared with the prior art, the present application is advantageous in the following aspects:
   It is more energy-saving and more flexible;
   It is supportive to the usage of an accumulative control method for power control;
   It is supportive to a dynamic adjustment of reference signals;
   It is supportive to a flexible adjustment of spatial relations of reference signals;
   It can avoid the occurrence of non-synchronization of power control while the UE and the network are controlling.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a schematic diagram of a reference signal according to one embodiment of the present application.

FIG. 7 illustrates a schematic diagram of a first signaling being used to indicate a first RS resource group according to one embodiment of the present application.

FIG. 8 illustrates a schematic diagram showing a first power adjustment state being used to calculate a first power according to one embodiment of the present application.

FIG. 9 illustrates a schematic diagram of a measurement on a first RS resource group being used for calculating a pathloss according to one embodiment of the present application.

FIG. 10 illustrates a structure block diagram of a processing device in a first node according to one embodiment of the present application.

FIG. 11 illustrates a structure block diagram of a processing device in a second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
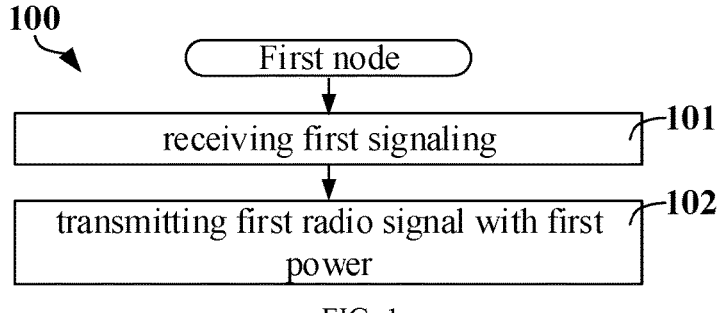
FIG. 1 illustrates a flowchart of at least one operation between receiving a first signaling and transmitting a first radio signal with a first power according to one embodiment of the present application.

Embodiment 1 illustrates a flowchart of receiving a first signaling and transmitting a first radio signal with a first power according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first signaling in step 101; and transmits a first radio signal with a first power in step 102.

Herein, as a response to receiving the first signaling, resetting a first power control adjustment state to 0; the first signaling is a physical layer signaling, or the first signaling is a MAC layer signaling; the first signaling is used to indicate a first RS resource group; the first power control adjustment state is used for calculating the first power.

In one embodiment, the first node is a User Equipment (UE).

In one embodiment, the first node is in an RRC connected state.

In one embodiment, a serving cell refers to a cell that the UE is camped on. Performing cell search includes that the UE searches for a suitable cell for a selected Public Land Mobile Network (PLMN) or Stand-alone Non-Public Network (SNPN), selects the suitable cell to provide available services, and monitors a control channel of the suitable cell, where the whole procedure is defined to be camped on the cell; in other words, relative to this UE, the cell being camped on is seen as a serving cell of the UE. Being camped on a cell in either RRC Idle state or RRC Inactive state is advantageous in the following aspects: enabling the UE to receive system information from a PLMN or an SNPN; after registration, if a UE hopes to establish an RRC connection or resume a suspended RRC connection, the UE can perform an initial access on a control channel of the camped cell to achieve such purpose; the network can page the UE; so that the UE can receive notifications from the Earthquake and Tsunami Warning System (ETWS) and the Commercial Mobile Alert System (CMAS).

In one embodiment, for a UE in RRC connected state without being configured with carrier aggregation/dual connectivity (CA/DC), there is only one serving cell that comprises a primary cell. For a UE in RRC connected state that is configured with carrier aggregation/dual connectivity (CA/DC), a serving cell is used for indicating a cell set comprising a Special Cell (SpCell) and all secondary cells. A Primary Cell is a cell in a Master Cell Group (MCG), i.e., an MCG cell, working on the primary frequency, and the UE performs an initial connection establishment procedure or initiates a connection re-establishment on the Primary Cell. For dual connectivity (DC) operation, a special cell refers to a Primary Cell (PCell) in an MCG or a Primary SCG Cell (PSCell) in a Secondary Cell Group (SCG); otherwise, the special cell refers to a PCell.

In one embodiment, working frequency of a Secondary Cell (SCell) is secondary frequency.

In one embodiment, separate contents in information elements (IEs) are called fields.

In one embodiment, Multi-Radio Dual Connectivity (MR-DC) refers to dual connectivity with E-UTRA and an NR node, or between two NR nodes.

In one embodiment, in MR-DC, a radio access node providing a control plane connection to the core network is a master node, where the master node can be a master eNB, a master ng-eNB or a master gNB.

In one embodiment, an MCG refers to a group of serving cells associated with a master node in MR-DC, including a SpCell, and optionally, one or multiple SCells.

In one embodiment, a PCell is a SpCell of an MCG.

In one embodiment, a PSCell is a SpCell of an SCG.

In one embodiment, in MR-DC, a radio access node not providing a control plane connection to the core network but providing extra resources for the UE is a secondary node. The secondary node can be an en-gNB, a secondary ng-eNB or a secondary gNB.

In one embodiment, in MR-DC, a group of serving cells associated with a secondary node is a secondary cell group (SCG), including a SpCell and, optionally, one or multiple SCells.

In one embodiment, the first signaling is not transmitted via sidelink.

In one embodiment, the first signaling is transmitted via sidelink.

In one embodiment, the first signaling is transmitted via a link other than the sidelink.

In one embodiment, the first signaling is transmitted via a masterlink.

In one embodiment, a transmitter of the first signaling is an MCG of the first node.

In one embodiment, a transmitter of the first signaling is a PCell of the first node.

In one embodiment, a generator of the first signaling is a PCell of the first node.

In one embodiment, a transmitter of the first signaling is a serving cell of the first node.

In one embodiment, the first signaling is or comprises a MAC CE.

In one embodiment, the first signaling is or comprises a piece of Downlink Control Information (DCI).

In one embodiment, the first signaling is transmitted on a Physical Downlink Control Channel (PDCCH).

In one embodiment, the first signaling comprises at least one field of a DCI.

In one embodiment, the first signaling is Unicast.

In one embodiment, a C-RNTI of the first node is used for scrambling the first signaling.

In one embodiment, the first signaling is broadcast.

In one embodiment, a G-RNTI is used for scrambling the first signaling.

In one embodiment, before receiving the first signaling, the first node is configured with application of transmit power control accumulation.

In one embodiment, before receiving the first signaling, the first node is configured to enable tpc-Accumulation.

In one embodiment, before receiving the first signaling, the first node is configured to enable tpc-Accumulation.

In one embodiment, before receiving the first signaling, the first node is not configured not to use tpc-Accumulation.

In one embodiment, before receiving the first signaling, the first node is not configured with tpc-Accumulation.

In one embodiment, being not configured with tpc-Accumulation means that the first node applies the transmit power control accumulation.

In one embodiment, the application of transmit power control accumulation is configured by default.

In one embodiment, the first Reference Signal (RS) resource group comprises one RS resource.

In one embodiment, the first RS resource group comprises two RS resources.

In one embodiment, the first RS resource group comprises multiple RS resources.

In one embodiment, the first RS resource group serves as a PUSCH pathloss reference.

In one embodiment, the first RS resource group is or comprises a PUSCH-PathlossReferenceRS.

In one embodiment, the first radio signal comprises a signal transmitted on a physical uplink shared channel (PUSCH).

In one embodiment, the first radio signal comprises a sounding reference signal (SRS).

In one embodiment, the first radio signal is transmitted in a first transmission occasion.

In one embodiment, a transmission power of the first transmission occasion is a first power.

In one embodiment, a transmit power of the first radio signal is a first power.

In one embodiment, the first radio signal is an uplink radio signal.

In one embodiment, the first radio signal is used for acknowledging the first signaling.

In one embodiment, the first signaling is used for a UL grant.

In one subembodiment, the first signaling is a DCI indicating a UL grant.

In one embodiment, the first signaling is used for a DL grant.

In one subembodiment, the first signaling is a DCI indicating a DL grant.

In one embodiment, the first signaling is used for downlink scheduling.

In one embodiment, the first signaling is a DCI indicating downlink resource allocation.

In one embodiment, the first signaling is a DCI, with a format of the first signaling being a first format.

In one embodiment, the first format is or includes 0_0.

In one embodiment, the first format is or includes 0_1.

In one embodiment, the first format is or includes 0_2.

In one embodiment, the first format is or includes 0_3.

In one embodiment, the first format is or includes 0_4.

In one embodiment, the first format is or includes 0_5.

In one embodiment, the first format is or includes 0_6.

In one embodiment, the first format is or includes 1_0.

In one embodiment, the first format is or includes 1_1.

In one embodiment, the first format is or includes 1_2.

In one embodiment, the first format is or includes 1_3.

In one embodiment, the first format is or includes 1_4.

In one embodiment, the first format is or includes 1_5.

In one embodiment, the first format is or includes 1_6.

In one embodiment, the first format is or includes 2_0.

In one embodiment, the first format is or includes 2_1.

In one embodiment, the first format is or includes 2_2.

In one embodiment, the first format is or includes 2_3.

In one embodiment, the first format is or includes 2_4.

In one embodiment, the first format is or includes 2_5.

In one embodiment, the first format is or includes 2_6.

In one embodiment, the first format is or includes 2_7.

In one embodiment, the first format is or includes 2_8.

In one embodiment, the first format is or includes 2_9.

In one embodiment, the first format is or includes 2_10.

In one embodiment, the first format is or includes 5_x, where x is a non-negative integer.

In one embodiment, the first signaling is a DCI for power control.

In one embodiment, the first signaling is a DCI for indicating or adjusting spatial parameters.

In one embodiment, using a first RNTI for scrambling the first signaling is used for indicating a reset of a first power control adjustment state to 0.

In one embodiment, using a first RNTI for scrambling the first signaling is used for indicating the first RS resource group.

In one embodiment, using a first RNTI for scrambling the first signaling is used for indicating a switch off or deactivation of a TRP.

In one embodiment, using a first RNTI for scrambling the first signaling is used for indicating an activation of a TRP.

In one embodiment, using a first RNTI for scrambling the first signaling is used for indicating a switch off or deactivation of at least one reference signal resource.

In one embodiment, using a first RNTI for scrambling the first signaling is used for indicating an activation of at least one reference signal resource.

In one embodiment, the first signaling comprises a first field, the first field indicating a reset of a first power control adjustment state to 0.

In one embodiment, the first signaling comprises a first field, the first field indicating a first RS resource group.

In one embodiment, the first signaling comprises a first field, the first field indicating a deactivation or a switch off of a TRP.

In one embodiment, the first signaling comprises a first field, the first field indicating an activation or usage of a TRP.

In one embodiment, the first signaling comprises a first field, the first field indicating an activation or usage of at least one reference signal resource.

In one embodiment, the first signaling comprises a first field, the first field indicating a deactivation or suspense of at least one reference signal resource.

In one embodiment, the first field is an SRI field.

In one embodiment, the first field is or includes a first SRI field.

In one embodiment, the first field is or includes a second SRI field.

In one embodiment, the first field is a field for indicating spatial parameters.

In one embodiment, the first field is an SRI indication field.

In one embodiment, the first field only comprises 1 bit.

In one embodiment, the first field only comprises 2 bits.

In one embodiment, a size of the first field is variable.

In one embodiment, the first signaling is a MAC CE, and a Logical Channel Identity for the first signaling is a first LCID.

In one embodiment, the first signaling is related to activation or deactivation.

In one embodiment, the first signaling is related to a TCI.

In one embodiment, the first signaling is related to a unified TCI.

In one embodiment, the first signaling is related to a CSI report.

In one embodiment, the first signaling is related to power control.

In one embodiment, the first signaling is related to an SRS.

In one embodiment, the first signaling is related to a CSI-RS report.

In one embodiment, the first RS resource group is used for positioning.

In one embodiment, the first RS resource group is for an SCG.

In one embodiment, the first RS resource group is for an MCG.

In one embodiment, the first RS resource group is for an SCG and an MCG.

In one embodiment, the first power adjustment state is a l-th one among all power adjustment states, where l is a non-negative integer.

In one subembodiment, l is equal to 0.

In one subembodiment, l is equal to 1.

In one subembodiment, l is equal to 2.

In one embodiment, the first power adjustment state is for a cell c.

In one subembodiment, the cell c is any cell.

In one embodiment, the first power adjustment state is for an uplink BWP b.

In one subembodiment, the uplink BWP b is an active BWP.

In one embodiment, the first power adjustment state is for a carrier f.

In one subembodiment, the carrier f is any carrier.

In one embodiment, the action of resetting the first power control adjustment state to 0 comprises: Setting the value of the first transmission occasion to which the first power adjustment state corresponds and the value of any transmission occasion before the first transmission occasion to 0.

In one embodiment, the action of resetting the first power control adjustment state to 0 comprises: Setting $f_{b,f,c}(k,l)=0$, $k=0, 1, \ldots, i$.

In one subembodiment, where $f_{b,f,c}(k,l)$ represents a power adjustment state for a carrier f in an uplink BWP b for a cell c.

In one subembodiment, where $f_{b,f,c}(k,l)$ represents the first power adjustment state.

In one subembodiment, k is used for identifying any transmission occasion, where $k=0, 1 \ldots, i$.

In one subembodiment, i is used for identifying a present transmission occasion.

In one subembodiment, i is used for identifying a transmission occasion after having received the first signaling.

In one subembodiment, i is used for identifying a first transmission occasion after having received the first signaling.

In one embodiment, the first RS resource group is downlink.

In one embodiment, the first RS resource group is associated with an SRS resource group of the first node.

In one subembodiment, the SRS resource group is uplink.

In one subembodiment, the first RS resource group only comprises one RS resource.

In one subembodiment, the first RS resource group comprises more than one RS resource.

In one subembodiment, the SRS resource group of the first node only comprises one SRS resource.

In one subembodiment, the SRS resource group of the first node only comprises more than one SRS resource.

In one subembodiment, each RS resource in the first RS resource group respectively corresponds to an SRS resource in the SRS resource group of the first node.

In one subembodiment, an RS resource in the first RS resource group is associated with any SRS resource in an SRS resource group of the first node.

In one subembodiment, the mapping between the first RS resource group and an SRS resource group of the first node depends on whether the SRS resource group is used as a 'Codebook' or a 'nonCodebook'.

In one subembodiment, the first signaling is used to determine the mapping between the first RS resource group and an SRS resource group of the first node.

In one subembodiment, the first signaling indicates the mapping between the first RS resource group and an SRS resource group of the first node.

In one subembodiment, the SRS resource group of the first node is with usage set to 'Codebook'.

In one subembodiment, the SRS resource group of the first node is with usage set to 'nonCodebook'.

In one embodiment, before receiving the first signaling and when receiving the first signaling, the P0's value remains unchanged.

In one embodiment, before receiving the first signaling and when receiving the first signaling, $$P_{0_{UE_{PUSCH}}, b, f, c}(j)$$

remains unchanged.

In one subembodiment, j is used to determine 1.

In one subembodiment, $$P_{0_{UE_{PUSCH}}, b, f, c}(j)$$

is related to an initial transmit power.

In one subembodiment, $$P_{0_{UE_{PUSCH}}, b, f, c}(j)$$

is a sum of some parameters, used for determining a first power.

In one embodiment, before receiving the first signaling and after receiving the first signaling, the P0's value remains unchanged.

In one subembodiment, the P0's value is associated with the first power adjustment state.

In one embodiment, before receiving the first signaling and after receiving the first signaling, $$P_{0_{UE_{PUSCH}}, b, f, c}(j)$$

remains unchanged.

In one subembodiment, j is used to determine 1.

In one subembodiment, $$P_{0_{UE_{PUSCH}}, b, f, c}(j)$$

is related to an initial transmit power.

In one subembodiment, $$P_{0_{UE_{PUSCH}}, b, f, c}(j)$$

is a sum of some parameters, used for determining a first power.

In one subembodiment, the $$P_{0_{UE_{PUSCH}}, b, f, c}(j)$$

is associated with the first power adjustment state.

In one embodiment, on the condition that a maximum transmit power is not reached, the first power is linear with the first power adjustment state.

In one embodiment, before receiving the first signaling and when receiving the first signaling, the value of alpha remains unchanged.

In one embodiment, before receiving the first signaling and when receiving the first signaling, $\alpha_{b,f,c}(j)$ remains unchanged.

In one subembodiment, j is used to determine 1.

In one subembodiment, $\alpha_{b,f,c}(j)$ is for an uplink BWP b of a carrier f for a cell c.

In one subembodiment, on the condition that a maximum transmit power is not reached, a pathloss is linear with an uplink transmit power, where $\alpha_{b,f,c}(j)$ is a relevant coefficient.

In one embodiment, before receiving the first signaling and after receiving the first signaling, the value of alpha remains unchanged.

In one subembodiment, the alpha's value is associated with the first power adjustment state.

In one embodiment, before receiving the first signaling and after receiving the first signaling, $\alpha_{b,f,c}(j)$ remains unchanged.

In one subembodiment, j is used to determine 1.

In one subembodiment, $\alpha_{b,f,c}(j)$ is for an uplink BWP b of a carrier f for a cell c.

In one subembodiment, on the condition that a maximum transmit power is not reached, a pathloss is linear with an uplink transmit power, where $\alpha_{b,f,c}(j)$ is a correlation coefficient.

In one subembodiment, the $\alpha_{b,f,c}(j)$ is associated with the first RS reference resource group.

In one embodiment, the $\alpha_{b,f,c}(j)$ is associated with the first RS reference resource group.

In one embodiment, the first signaling is used to trigger the performing of a measurement on a first RS resource group.

In one embodiment, the sentence of "as a response to receiving the first signaling, performing a measurement on the first RS resource group" means: beginning to make periodic reports of measurement results on the first RS resource group.

In one embodiment, the sentence of "as a response to receiving the first signaling, performing a measurement on the first RS resource group" means: making semi-persistent reports of measurement results on the first RS resource group.

In one embodiment, the sentence of "as a response to receiving the first signaling, performing a measurement on the first RS resource group" means: the first signaling being used to indicate a report of a measurement result on the first RS resource group.

In one embodiment, the sentence of "as a response to receiving the first signaling, performing a measurement on the first RS resource group" means: the first signaling being used to configure a report of a measurement result on the first RS resource group.

In one embodiment, the sentence of "as a response to receiving the first signaling, performing a measurement on the first RS resource group" means: the first signaling being used to trigger a report of a measurement result on the first RS resource group.

In one embodiment, the sentence of "as a response to receiving the first signaling, performing a measurement on the first RS resource group" means: the first signaling being used to determine a start of a report of a measurement result on the first RS resource group.

In one embodiment, as a response to receiving the first signaling, begin reporting a measurement result on the first RS resource group.

In one embodiment, as a response to receiving the first signaling, stop reporting a measurement result on the first RS resource group.

In one embodiment, the first signaling is used to trigger a stop of performing a measurement on a first RS resource group.

In one embodiment, the sentence of "as a response to receiving the first signaling, stop reporting a measurement result on the first RS resource group" means: the first signaling being used to indicate a stop or a suspense of a report of a measurement result on the first RS resource group.

In one embodiment, the sentence of "as a response to receiving the first signaling, stop reporting a measurement result on the first RS resource group" means: the first signaling being used for releasing configurations of a report made of a measurement result on the first RS resource group.

In one embodiment, the sentence of "as a response to receiving the first signaling, stop reporting a measurement result on the first RS resource group" means: the first signaling being used to trigger a stop of a report of a measurement result on the first RS resource group.

In one embodiment, the sentence of "as a response to receiving the first signaling, stop reporting a measurement result on the first RS resource group" means: the first signaling being used to determine a stop of a report of a measurement result on the first RS resource group.

In one embodiment, as a response to receiving the first signaling, stop reporting a measurement result on the first RS resource group.

In one embodiment, the sentence of "as a response to receiving the first signaling, stop reporting a measurement result on the first RS resource group" means: stopping making periodic reports of measurement results on the first RS resource group.

In one embodiment, the sentence of "as a response to receiving the first signaling, stop reporting a measurement result on the first RS resource group" means: stopping semi-persistent reports of measurement results on the first RS resource group.

In one embodiment, the first node, as a response to receiving the first signaling, performs a measurement on the first RS resource group based on a first QCL parameter.

In one embodiment, before the first node receives the first signaling, the measurement performed on the first RS resource group is based on a second QCL parameter.

In one embodiment, the first QCL parameter is different from the second QCL parameter.

In one embodiment, the first QCL parameter and the second QCL parameter respectively comprise reference signal resources associated with different PCIs.

In one embodiment, the first QCL parameter and the second QCL parameter respectively comprise reference signal resources associated with an identical PCI.

In one embodiment, the first QCL parameter and the second QCL parameter respectively comprise reference signal resources associated with different cells.

In one embodiment, the first QCL parameter and the second QCL parameter respectively comprise reference signal resources associated with an identical cell.

In one embodiment, the first QCL parameter and the second QCL parameter correspond to different cells.

In one embodiment, the first QCL parameter and the second QCL parameter correspond to an identical cell.

In one embodiment, the first QCL parameter comprises a spatial parameter.

In one embodiment, the first QCL parameter comprises a TCI-related parameter.

In one embodiment, the first QCL parameter comprises a TCI-state.

In one embodiment, the first QCL parameter comprises at least partial fields or parameters in a TCI-state.

In one embodiment, the first QCL parameter comprises a QCL reference signal.

In one embodiment, the first QCL parameter comprises a QCL reference signal resource.

In one embodiment, the first QCL parameter comprises a QCL reference signal index.

In one embodiment, the first QCL parameter comprises a QCL typeA reference signal resource.

In one embodiment, the first QCL parameter comprises a QCL typeB reference signal resource.

In one embodiment, the first QCL parameter comprises a QCL typeC reference signal resource.

In one embodiment, the first QCL parameter comprises a QCL typeD reference signal resource.

In one embodiment, the first QCL parameter comprises an SSB-related parameter.

In one embodiment, the first QCL parameter comprises a CSI-RS-related parameter.

In one embodiment, the first QCL parameter is different from the second QCL parameter.

In one embodiment, the first QCL parameter and the second QCL parameter are respectively associated with different PCIs.

In one embodiment, the second QCL parameter comprises a spatial parameter.

In one embodiment, the second QCL parameter comprises a TCI-related parameter.

In one embodiment, the second QCL parameter comprises a TCI-state.

In one embodiment, the second QCL parameter comprises at least partial fields or parameters in a TCI-state.

In one embodiment, the second QCL parameter comprises a QCL reference signal.

In one embodiment, the second QCL parameter comprises a QCL reference signal resource.

In one embodiment, the second QCL parameter comprises a QCL reference signal index.

In one embodiment, the second QCL parameter comprises a QCL typeA reference signal resource.

In one embodiment, the second QCL parameter comprises a QCL typeB reference signal resource.

In one embodiment, the second QCL parameter comprises a QCL typeC reference signal resource.

In one embodiment, the second QCL parameter comprises a QCL typeD reference signal resource.

In one embodiment, the second QCL parameter comprises an SSB-related parameter.

In one embodiment, the second QCL parameter comprises a CSI-RS-related parameter.

In one embodiment, the first QCL parameter and the second QCL parameter are both for the downlink.

In one embodiment, the first QCL parameter and the second QCL parameter are both for the uplink.

In one embodiment, one of the first QCL parameter and the second QCL parameter is for the uplink, the other for the downlink.

In one embodiment, the first QCL parameter and the second QCL parameter respectively correspond to different beams.

In one embodiment, the first QCL parameter and the second QCL parameter respectively correspond to different TRPs.

In one embodiment, the first signaling is used for indicating that a beam determined by the second QCL parameter is stopped from being used or is switched off.

In one embodiment, the first signaling is used for indicating that a TRP determined by the second QCL parameter is stopped from being used or is switched off.

In one embodiment, the first signaling is used for indicating a first time window, and the first node performs a measurement on the first RS resource group based on a first QCL parameter within the first time window.

In one subembodiment, the first node performs a measurement on the first RS resource group based on the second QCL parameter after an end of the first time window.

In one subembodiment, the first node resets a first power control adjustment state to 0 before a start of the first time window or when the first time window starts.

In one subembodiment, the first node resets a first power control adjustment state to 0 when the first time window ends or after an end of the first time window.

In one subembodiment, a start or an end of the first time window is used for triggering a reset of a first power control adjustment state to 0.

In one embodiment, the action of performing a measurement on the first RS resource group based on a first QCL parameter comprises: a measurement on the first RS resource group using at least one parameter of the first QCL parameter(s).

In one embodiment, the action of performing a measurement on the first RS resource group based on a first QCL parameter comprises: using the first QCL parameter to determine an RS resource in the first RS resource group for a measurement.

In one embodiment, the action of performing a measurement on the first RS resource group based on a first QCL parameter comprises: using the first QCL parameter to determine time measured on the first RS resource group.

In one embodiment, the action of performing a measurement on the first RS resource group based on a first QCL parameter comprises: using the first QCL parameter as a reception parameter for performing a measurement on the first RS resource group.

In one embodiment, the action of performing a measurement on the first RS resource group based on a first QCL parameter comprises: using the first QCL parameter to determine a frequency or bandwidth measured on the first RS resource group.

In one embodiment, the action of performing a measurement on the first RS resource group based on a first QCL parameter comprises: measuring a reference signal resource indicated by the first QCL parameter.

In one embodiment, the action of performing a measurement on the first RS resource group based on a first QCL parameter comprises: using the first QCL parameter to determine a transmit power of the first RS resource group.

In one embodiment, the action of performing a measurement on the first RS resource group based on a first QCL parameter comprises: using the first QCL parameter to calculate a measurement result after performing a measurement on the first RS resource group.

In one embodiment, the action of performing a measurement on the first RS resource group based on a first QCL parameter comprises: a reference signal determined by the first QCL parameter occupying the first RS resource group.

In one embodiment, the action of performing a measurement on the first RS resource group based on a second QCL parameter comprises: a measurement on the first RS resource group using at least one parameter of the second QCL parameter(s).

In one embodiment, the action of performing a measurement on the first RS resource group based on a second QCL parameter comprises: using the second QCL parameter to determine an RS resource in the first RS resource group for performing a measurement.

In one embodiment, the action of performing a measurement on the first RS resource group based on a second QCL parameter comprises: using the second QCL parameter to determine time measured on the first RS resource group.

In one embodiment, the action of performing a measurement on the first RS resource group based on a second QCL parameter comprises: using the second QCL parameter as a reception parameter for performing a measurement on the first RS resource group.

In one embodiment, the action of performing a measurement on the first RS resource group based on a second QCL parameter comprises: using the second QCL parameter to determine a frequency or bandwidth measured on the first RS resource group.

In one embodiment, the action of performing a measurement on the first RS resource group based on a second QCL parameter comprises: measuring a reference signal resource indicated by the second QCL parameter.

In one embodiment, the action of performing a measurement on the first RS resource group based on a second QCL parameter comprises: using the second QCL parameter to determine a transmit power of the first RS resource group.

In one embodiment, the action of performing a measurement on the first RS resource group based on a second QCL parameter comprises: using the second QCL parameter to calculate a measurement result after performing a measurement on the first RS resource group.

In one embodiment, the action of performing a measurement on the first RS resource group based on a first QCL parameter comprises: a reference signal determined by the second QCL parameter occupying the first RS resource group.

In one embodiment, the first signaling is used to determine that a number of power control adjustment state(s) is 1; the first signaling is a physical layer signaling.

In one embodiment, before receiving the first signaling, the number of the power control adjustment state(s) is greater than 1.

In one embodiment, the number of the power control adjustment state(s) being 1 is used for resetting the first power control adjustment state to 0.

In one embodiment, the number of the power control adjustment state(s) having changed is used for resetting the first power control adjustment state to 0.

In one embodiment, the number of the power control adjustment state(s) having changed is used for triggering a reset of the first power control adjustment state to 0.

In one embodiment, before receiving the first signaling, the number of the power control adjustment state(s) is 2.

In one embodiment, the number of the power control adjustment state(s) determined by the first signaling is for a carrier f in an uplink BWP b for a cell c.

In one embodiment, the power control adjustment state before receiving the first signaling is for a carrier f in an uplink BWP b for a cell c.

In one embodiment, before the first signaling, a serving cell of the first node configures 2 power adjustment states via a signaling twoPUSCH-PC-AdjustmentStates.

In one subembodiment, the 2 power control adjustment states are for a carrier f in an uplink BWP b for a cell c.

In one embodiment, the phrase that the first signaling is used to determine that a number of power control adjustment state(s) is 1 means that: the first signaling explicitly indicates that the number of power control adjustment state(s) is 1.

In one embodiment, the phrase that the first signaling is used to determine that a number of power control adjustment state(s) is 1 means that: the first signaling indicates a first index, the first index being used to determine that the number of power control adjustment state(s) is 1.

In one embodiment, the phrase that the first signaling is used to determine that a number of power control adjustment state(s) is 1 means that: the first signaling indicates a parameter j, the parameter j being used to determine that the number of power control adjustment state(s) is 1.

In one embodiment, the phrase that the first signaling is used to determine that a number of power control adjustment state(s) is 1 means that: the first signaling indicates a power control cycle, and the power control cycle indicated by the first signaling is determined to be the number of the power control adjustment state(s).

In one embodiment, the first signaling is used to indicate $$P_{O_{UE_{PUSCH}}, b, f, c}(j),$$

the $$P_{O_{UE_{PUSCH}}, b, f, c}(j)$$

being used to determine a number of power control adjustment state(s).

In one embodiment, the first signaling is used to indicate $\alpha_{b,f,c}(j)$, the $\alpha_{b,f,c}(j)$ being used to determine a number of power control adjustment state(s).

In one embodiment, the first signaling explicitly indicates whether a first power control adjustment state is to be reset.

In one embodiment, a field of the first signaling explicitly indicates whether a first power control adjustment state is to be reset.

Embodiment 2

Figure 2:
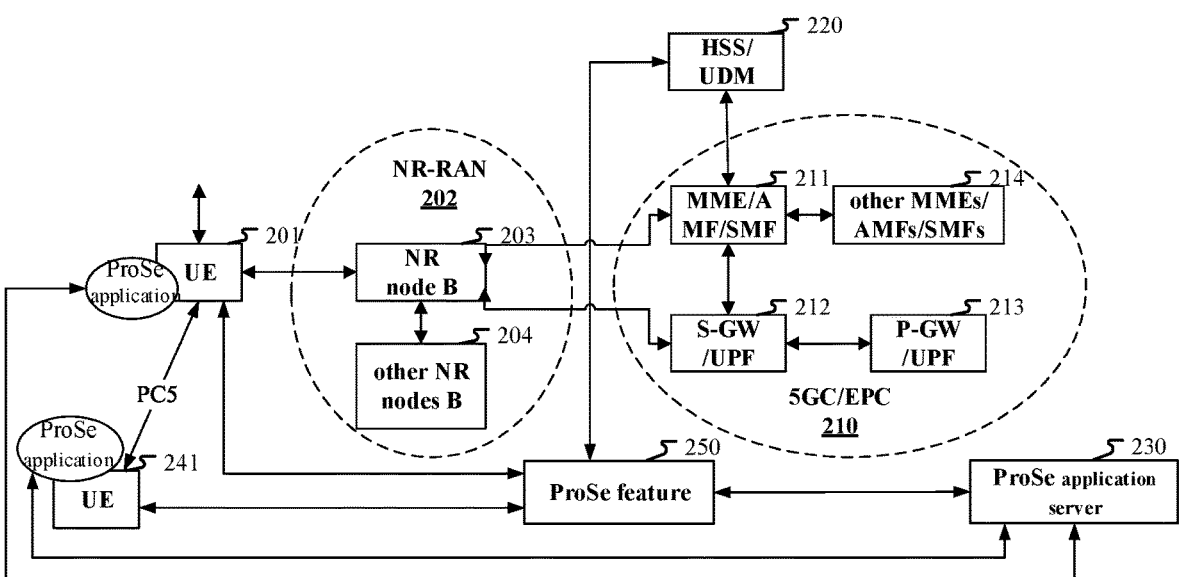
FIG. 2 illustrates a schematic diagram of a network architecture according to one embodiment of the present application.

Embodiment 2 illustrates a schematic diagram of a network architecture according to the present application, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present application is the UE 201.

In one embodiment, a base station of the second node in the present application is the gNB 203.

In one embodiment, a radio link from the UE 201 to the NR Node B is an uplink.

In one embodiment, a radio link from the NR Node B to the UE 201 is a downlink.

In one embodiment, the UE 201 supports relay transmission.

In one embodiment, the UE 201 includes cellphone.

In one embodiment, the UE 201 is a means of transportation including automobile.

In one embodiment, the gNB 203 is a MacroCellular base station.

In one embodiment, the gNB 203 is a Micro Cell base station.

In one embodiment, the gNB 203 is a PicoCell base station.

In one embodiment, the gNB 203 is a flight platform.

In one embodiment, the gNB 203 is satellite equipment.

Embodiment 3

Figure 3:
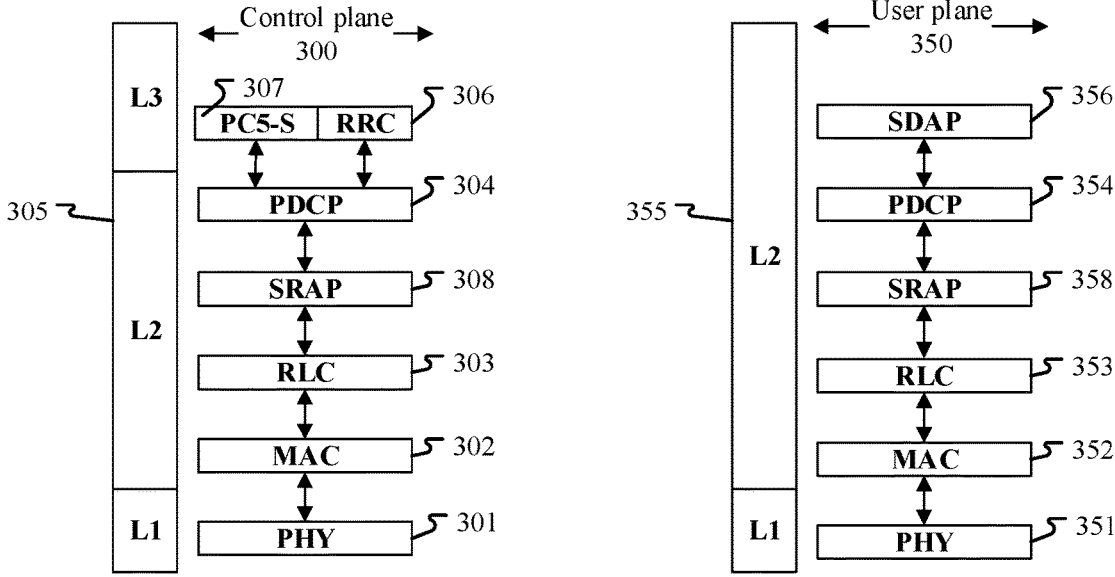
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer 307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. An SRB can be seen as the service or interface provided by a PDCP layer for a higher layer, such as RRC layer. The SRBs in an NR system include SRB1, SRB2, and SRB3, and optionally, SRB4 when concerning sidelink communications, which are respectively used for transmitting all types of control signalings. The SRB is a bearer between a UE and an access network used for transmitting control signalings between them, including an RRC signaling. The SRB1 has special meaning to the UE, since for each UE that has established RRC connection, there is an SRB1 that is used for transmitting RRC signaling, and most signalings are transmitted via the SRB1. If the SRB1 is interrupted or cannot work, the UE will have to perform RRC re-establishment. The SRB2 is generally used for transmitting NAS signaling or any signaling concerning security. The UE can be configured without the SRB3. Unless for urgent traffics, the UE must establish an RRC connection with the network to proceed with communications. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.). For a UE involving relay services, its control plane can also comprise an Adaptation sublayer Sidelink Relay Adaptation Protocol (SRAP) 308, and its user plane can also comprise an Adaptation sublayer SRAP358. The introduction of the Adaptation layer is beneficial to lower layers, for instance, a MAC layer, or an RLC layer, to multiplex and/or distinguish data from multiple source UEs. For nodes not joined in relay communications, none of the PC5-S307, SRAP308 and SRAP358 will be needed in the process of communications.

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the MAC 302 or the PHY 301.

In one embodiment, the first MAC CE in the present application is generated by the MAC 302.

In one embodiment, the first signal in the present application is generated by the RRC 306 or the MAC 302 or the PHY 301.

In one embodiment, the second signal in the present application is generated by the RRC 306 or the MAC 302 or the PHY 301.

Embodiment 4

Figure 4:
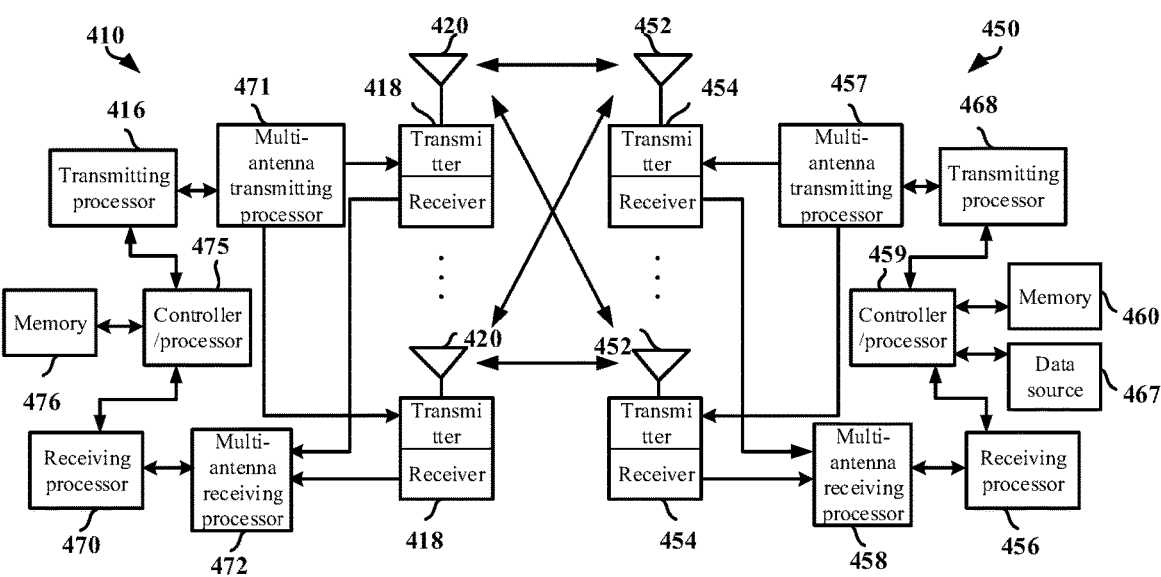
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, and optionally a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, and optionally a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer (Layer-2). In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes;

the at least one memory and the computer program codes are configured to be used in collaboration with the at least one processor. The first communication device 450 at least: receives a first signaling; and as a response to receiving the first signaling, resets a first power control adjustment state to 0; and transmits a first radio signal with a first power; herein, the first signaling is a physical layer signaling, or the first signaling is a MAC layer signaling; the first signaling is used to indicate a first RS resource group; the first power control adjustment state is used for calculating the first power.

In one embodiment, the first communication node 450 comprises a memory that stores a computer readable instruction program, the computer readable instruction program generates actions when executed by at least one processor, which include: receiving a first signaling; and as a response to receiving the first signaling, resetting a first power control adjustment state to 0; and transmitting a first radio signal with a first power; herein, the first signaling is a physical layer signaling, or the first signaling is a MAC layer signaling; the first signaling is used to indicate a first RS resource group; the first power control adjustment state is used for calculating the first power.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first signaling; and receives a first radio signal; herein, the first signaling is a physical layer signaling, or the first signaling is a MAC layer signaling; the first signaling is used to indicate a first RS resource group; the first power control adjustment state is used for calculating the first power; a transmit (Tx) power of the first radio signal is a first power; the first signaling is used for triggering a reset of the first power control adjustment state to 0.

In one embodiment, the second communication node 410 comprises a memory that stores a computer readable instruction program, the computer readable instruction program generates actions when executed by at least one processor, which include: transmitting a first signaling; and receiving a first radio signal; herein, the first signaling is a physical layer signaling, or the first signaling is a MAC layer signaling; the first signaling is used to indicate a first RS resource group; the first power control adjustment state is used for calculating the first power; a transmit (Tx) power of the first radio signal is a first power; the first signaling is used for triggering a reset of the first power control adjustment state to 0.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a vehicle-mounted terminal.

In one embodiment, the first communication device 450 is a relay.

In one embodiment, the second communication device 410 is a satellite.

In one embodiment, the second communication device 410 is an aircraft.

In one embodiment, the second communication device 410 is a base station.

In one embodiment, the receiver 454 (comprising the antenna 452), the receiving processor 456 and the controller/processor 459 are used for receiving the first signaling in the present application.

In one embodiment, the transmitter 454 (comprising the antenna 452), the transmitting processor 468 and the controller/processor 459 are used for transmitting the first signal in the present application.

In one embodiment, the transmitter 454 (comprising the antenna 452), the transmitting processor 468 and the controller/processor 459 are used for transmitting the second signal in the present application.

In one embodiment, the transmitter 454 (comprising the antenna 452), the transmitting processor 468 and the controller/processor 459 are used for transmitting the first MAC CE in the present application.

In one embodiment, the transmitter 416 (comprising the antenna 420), the transmitting processor 412 and the controller/processor 440 are used for transmitting the first signaling in the present application.

In one embodiment, the receiver 416 (comprising the antenna 420), the receiving processor 412 and the controller/processor 440 are used for receiving the first signal in the present application.

In one embodiment, the receiver 416 (comprising the antenna 420), the receiving processor 412 and the controller/processor 440 are used for receiving the second signal in the present application.

In one embodiment, the receiver 416 (comprising the antenna 420), the receiving processor 412 and the controller/processor 440 are used for receiving the first MAC CE in the present application.

Embodiment 5

Figure 5:
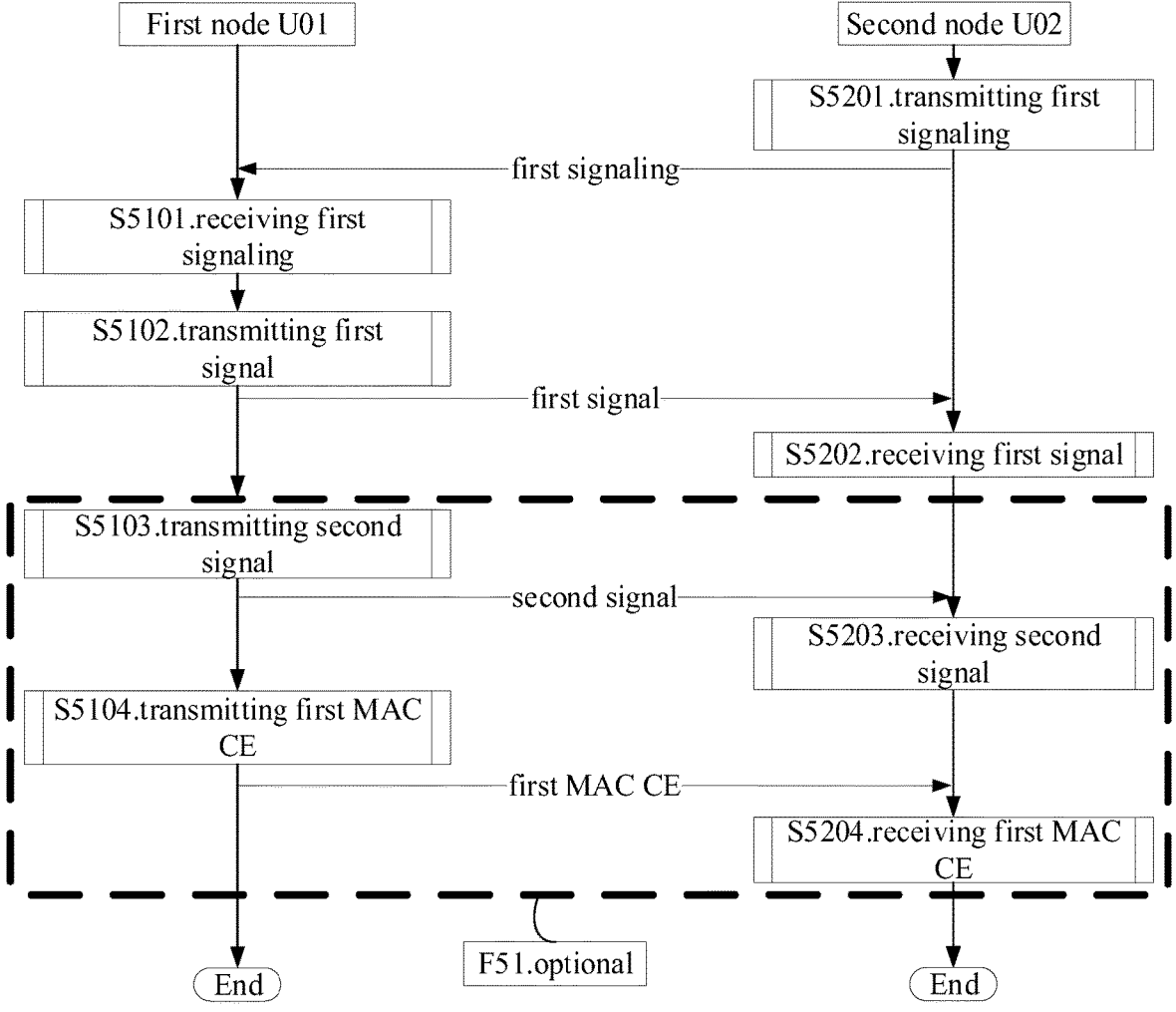
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to the first node in the present application. It should be particularly noted that the sequence illustrated herein does not set any limit on the orders in which signals are transmitted and implementations in this present application. Herein, steps in F51 are optional.

The first node U01 receives a first signaling in step S5101; and transmits a first signal in step S5102; and transmits a second signal in step S5103; and transmits a first MAC CE in step S5104.

The second node U02 transmits a first signaling in step S5201; and receives a first signal in step S5202; receives a second signal in step S5203; and receives a first MAC CE in step S5204.

In Embodiment 5, the first node U01 resets a first power control adjustment state to 0;

herein, the first signaling is a physical layer signaling, or the first signaling is a MAC layer signaling; the first signaling is used to indicate a first RS resource group; the first power control adjustment state is used for calculating the first power.

In one embodiment, the first node U01 is a UE, and the second node U02 is a serving cell or a cell group of the first node U01.

In one embodiment, the first node U01 is a UE, and the second node U02 is a base station serving the first node U01.

In one embodiment, the first node U01 transmits the first signaling via a downlink.

In one embodiment, the second node U02 is the first cell group.

In one embodiment, the second node U02 is a serving cell in the first cell group.

In one embodiment, the second node U02 is an MN of the first cell group.

In one embodiment, the second node U02 is a PCell.

In one embodiment, the second node U02 is a PSCell.

In one embodiment, the step S101 is earlier than the step S5102.

In one embodiment, the step S102 is earlier than the step S5103.

In one embodiment, the step S102 is later than the step S5103.

In one embodiment, the step S104 is later than the step S5102.

In one embodiment, a first MAC CE and the first signal are multiplexed in a same MAC PDU.

In one embodiment, a first MAC CE and the second signal are multiplexed in a same MAC PDU.

In one embodiment, the second signal is used for acknowledging the first signaling.

In one embodiment, the second signal is used for acknowledging that the first signaling is received.

In one embodiment, the second signal is used for acknowledging that executing the first signaling is completed.

In one embodiment, the first signaling is used for triggering the second signal.

In one embodiment, the second signal is Unicast.

In one embodiment, the first signaling is Unicast.

In one embodiment, the first signaling is non-Unicast.

In one embodiment, the second signal is non-Unicast.

In one embodiment, the first signal is Unicast.

In one embodiment, the first signal is non-Unicast.

In one embodiment, the first signaling is broadcast or multicast.

In one embodiment, the meaning of the phrase that the first signaling is broadcast or multicast includes: the first signaling being scrambled using a group-based RNTI.

In one embodiment, the meaning of the phrase that the first signaling is broadcast or multicast includes: the first signaling being scrambled using a G-RNTI.

In one embodiment, the first signal is the second signal.

In one embodiment, the first signal is used for acknowledging that the first signaling is received.

In one embodiment, the first signal is used for acknowledging that executing the first signaling is completed.

In one embodiment, the first signaling is used for triggering the first signal.

In one embodiment, the first RS resource group is used to determine a spatial parameter of the first signal.

In one embodiment, the first RS resource group is used to determine a spatial parameter of the second signal.

In one embodiment, the first QCL parameter is used for transmitting the first signal.

In one embodiment, the first QCL parameter is used for transmitting the second signal.

In one embodiment, the first QCL parameter is used for transmitting the first MAC CE.

In one embodiment, the first MAC CE is a MAC CE.

In one embodiment, the first MAC CE is a Single Entry PHR MAC CE.

In one embodiment, the first MAC CE is a Multiple Entry PHR MAC CE.

In one embodiment, the first MAC CE is used for reporting a power headroom.

In one embodiment, the first node U01 transmits the first MAC CE with a first power.

In one embodiment, the first node U01 transmits the second signal with a first power.

In one embodiment, the second node U02 provides or indicates tpc-Accumulation to the first node U01.

Embodiment 6

Embodiment 6 illustrates a schematic diagram of a reference signal according to one embodiment of the present application, as shown in FIG. 6.

In FIGS. 6, 601 and 602 are both symbolized by ellipses that respectively indicate transmissions determined by different transmission parameters.

In one embodiment, 601 and 602 are different beams.

In one embodiment, 601 is a first beam; 602 is a second beam.

In one embodiment, 601 and 602 are different TRPs.

In one embodiment, 601 is a first TRP; 602 is a second TRP.

In one embodiment, 601 is a first parameter group; 602 is a second parameter group.

In one subembodiment, 601 is a group of spatial parameters; 602 is another group of spatial parameters.

In one embodiment, 601 is a first reference signal resource; 602 is a second reference signal resource.

In one embodiment, 601 and 602 are determined by different reference signals.

In one embodiment, 601 is associated with a first RS resource group.

In one embodiment, 602 is associated with a second RS resource group.

In one embodiment, 601 is an SSB or is associated with an SSB.

In one embodiment, 601 is a CSI-RS or is associated with a CSI-RS.

In one embodiment, the first QCL parameter is related to 601 between 601 and 602.

In one embodiment, the second QCL parameter is related to 602 between 601 and 602.

In one embodiment, 601 is an identifier of a group of parameters or configurations or of a first RS resource group.

In one embodiment, 602 is an identifier of a group of parameters or configurations or of a second RS resource group.

In one embodiment, before receiving the first signaling, a measurement by the first node on the second RS resource group is used to determine an uplink transmit power.

In one embodiment, the first signaling indicates a suspense of the usage of an RS resource group associated with 602.

In one embodiment, the first signaling indicates a deactivation of an RS resource group associated with 602.

In one embodiment, the first signaling indicates a suspense of reporting of a measurement on an RS resource group associated with 602.

In one embodiment, the first signaling indicates an activation of an RS resource group associated with 601.

In one embodiment, the first signaling indicates a start of the usage of an RS resource group associated with 601.

In one embodiment, the first signaling indicates a start of reporting of a measurement on an RS resource group associated with 601.

In one embodiment, the above method is advantageous in that when adjusting a spatial parameter dynamically, for instance switching off a beam dynamically, no confusion will be caused for power control.

Embodiment 7

Embodiment 7 illustrates a schematic diagram of a first signaling being used to indicate a first RS resource group according to one embodiment of the present application, as shown in FIG. 7.

In one embodiment, the meaning of the sentence that the first signaling is used to indicate a first RS resource group includes at least one of the following embodiments.

In one embodiment, the first signaling indicates an identification of the first RS resource group.

In one embodiment, the first signaling indicates an index of the first RS resource group.

In one embodiment, the first RS resource group comprises a downlink RS resource relevant to a pathloss reference.

In one embodiment, the first RS resource group is or comprises a PUSCH-PathlossReferenceRS.

In one embodiment, the first RS resource group is or comprises a PathlossReferenceRS.

In one embodiment, the first signaling indicates an SRS-PathlossReferenceRS-Id.

In one embodiment, the first signaling indicates a PUSCH-PathlossReferenceRS-Id.

In one embodiment, the first signaling indicates a PUSCH-PathlossReferenceRS-Id-v1610.

In one embodiment, the first signaling indicates a sri-PUSCH-PathlossReferenceRS-Id.

In one embodiment, the first signaling indicates a sri-PUSCH-PowerControlId.

In one embodiment, the first signaling indicates a sri-P0-PUSCH-AlphaSetId.

In one embodiment, the first signaling indicates a sri-PUSCH-ClosedLoopIndex.

In one embodiment, the first signaling indicates an RS resource in a first RS resource group.

In one embodiment, the first signaling indicates a first RS resource group or a second RS resource group.

In one embodiment, the first signaling indicates the first RS resource group from a first RS resource group or a second RS resource group.

In one embodiment, the first signaling indicates the first RS resource group by indicating unavailable RS resource(s).

In one embodiment, the first signaling implicitly indicates the first RS resource group.

In one embodiment, one bit in the first signaling indicates the first RS resource group.

In one embodiment, the first signaling indicates the first RS resource group in candidate RS resources.

In one embodiment, the first signaling indicates at least one RS resource in the first RS resource group in candidate RS resources.

In one embodiment, the first signaling does not comprise a first specific field used for indicating the first RS resource group.

In one embodiment, the first signaling indicates at least one RS resource in the first RS resource group.

In one embodiment, the first signaling indicates (a) parameter(s) associated with at least one RS resource in the first RS resource group.

In one embodiment, the first signaling indicates the first RS resource group by indicating a first QCL parameter.

In one embodiment, the first signaling indicates the first RS resource group by indicating RS resource(s) having a QCL relationship with the first RS resource group.

In one embodiment, the first signaling indicates the first RS resource group by indicating an activation of RS resource(s) having a QCL relationship with the first RS resource group.

In one embodiment, the first signaling indicates RS resource(s) not belonging to the first RS resource group by indicating a deactivation of RS resource(s) having a QCL relationship with the first RS resource group.

Embodiment 8

Embodiment 8 illustrates a schematic diagram showing a first power adjustment state being used to calculate a first power according to one embodiment of the present application, as shown in FIG. 8.

In one embodiment, the first power is linear with the first power adjustment state.

In one embodiment, when a maximum transmit power is not reached, the first power is linear with the first power adjustment state.

In one embodiment, when a minimum transmit power is not reached, the first power is linear with the first power adjustment state.

In one embodiment, the first power is equal to a sum of the first power adjustment state and other parameter.

In one embodiment, when a maximum transmit power is not reached, the first power is equal to a sum of the first power adjustment state and other parameters.

In one embodiment, when a minimum transmit power is not reached, the first power is equal to a sum of the first power adjustment state and other parameters.

In one embodiment, P represents the first power, then P meets: $P=\min(Pmax, X+f)$, where Pmax is a maximum transmit power, X is a sum of other parameters, f represents a first power adjustment state; $\min(\ )$ is the function that yields a minimum value.

In one embodiment, Pmax is intrinsic to a device.

In one embodiment, Pmax is network-configured.

In one embodiment, Pmax is for a transmission occasion i.

In one subembodiment, the transmission occasion i is a next one transmission occasion.

In one subembodiment, the transmission occasion i is any one transmission occasion.

In one subembodiment, the transmission occasion i is a transmission occasion that determines a transmit power.

In one embodiment, partial parameters comprised by the X are network-configured, while other parameters are obtained by measurements.

In one embodiment, the X comprises a target receive (Rx) power.

In one embodiment, the X comprises a pathloss.

In one embodiment, a first power adjustment state of a transmission occasion i on a carrier f in an uplink BWP b for a cell c can be further expressed by $f_{b,f,c}(i,l)$.

In one subembodiment, there is(are) a total of M power adjustment state(s), where M is a positive integer, the first power adjustment state being a l-th one or a (l+1)-th one of the M power adjustment state(s).

In one subembodiment, l is a positive integer less than M.

In one subembodiment, l is any positive integer less than M.

In one subembodiment, M is equal to 1.

In one subembodiment, M is equal to 2.

In one subembodiment, M is greater than 1.

In one embodiment, the first node is provided with tpc-Accumulation.

In one embodiment, the first node is not provided with tpc-Accumulation.

In one embodiment, when provided with tpc-Accumulation, $f_{b,f,c}(i,l)=\delta_{PUSCH,b,f,c}(i,l)$.

In one embodiment, the value of $\delta_{PUSCH,b,f,c}$ is fixed.

In one embodiment, the value of $\delta_{PUSCH,b,f,c}$ depends on whether tpc-Accumulation is used.

In one embodiment, $\delta_{PUSCH,b,f,c}(i,l)$ is for a l-th power adjustment state and for a transmission occasion i.

In one embodiment, when not provided with tpc-Accumulation, $$f_{b,f,c}(i, l) = f_{b,f,c}(i - i_0, l) + \sum_{m=0}^{C(D_i)-1} \delta_{PUSCH,b,f,c}(m, l).$$

In one embodiment, $$\sum_{m=0}^{C(D_i)-1} \delta_{PUSCH,b,f,c}(m, l)$$

is a sum of TPC commands in a TPC command set $D_i$ with a cardinality being $C(D_i)$.

In one embodiment, a serving cell indicates a TPC command, the TPC command comprising for instance 2 bits, and the TPC command being mapped to $\delta_{PUSCH,b,f,c}$ based on tables.

In one embodiment, i0 is also a transmission occasion.

In one embodiment, with an accumulated $\delta_{PUSCH,b,f,c}$, TPC commands are respectively mapped by −1, 0, 1, and 3.

In one embodiment, with an absolute $\delta_{PUSCH,b,f,c}$, TPC commands are respectively mapped by −4, −1, 1, and 4.

In one embodiment, mappings above are not limited to values of l and m.

In one embodiment, the meaning of providing tpc-Accumulation includes that a serving cell indicates disabled tpc accumulation.

In one embodiment, the meaning of not providing tpc-Accumulation includes that a serving cell indicates enabled tpc accumulation.

In one embodiment, the meaning of not providing tpc-Accumulation includes that a serving cell does not indicate tpc-Accumulation.

In one embodiment, the meaning of not providing tpc-Accumulation includes that tpc-Accumulation is absent.

In one embodiment, for an SRS, the first power adjustment state is $h_{b,f,c}(i)$.

In one embodiment, for an SRS, the first power adjustment state is $h_{b,f,c}(i,l)$.

In one embodiment, for a PUSCH, the first power adjustment state is $f_{b,f,c}(i,l)$.

In one embodiment, for an SRS, the first power adjustment state is expressed by $h_{b,f,c}(i,l)$.

In one embodiment, for a PUSCH, the first power adjustment state is expressed by $f_{b,f,c}(i,l)$.

In one embodiment, for an SRS, the first power adjustment state is expressed by $h_{b,f,c}(i)$.

In one embodiment, when the serving cell indicates the usage of an identical power adjustment state, $h_{b,f,c}(i,l)=f_{b,f,c}(i,l)$.

In one embodiment, when there is no PUSCH transmission being configured on a carrier f in an uplink BWP b in a cell c, or when a serving cell indicates that a PUSCH and an SRS use separate power control adjustment states, the first power adjustment state satisfies:

$$h_{b,f,c}(i) = h_{b,f,c}(i - i_0) + \sum_{m=0}^{c(s_i)-1} \delta_{SRS,b,f,c}(m).$$

In one subembodiment, tpc-Accumulation is not provided.

In one embodiment, when provided with tpc-Accumulation, $h_{b,f,c}(i)=\delta_{SRS,b,f,c}(i)$.

In one embodiment, a serving cell indicates a TPC command, the TPC command comprising for instance 2 bits, and the TPC command being mapped to $\delta_{SRS,b,f,c}$ based on tables.

In one embodiment, with an accumulative $\delta_{SRS,b,f,c}$, TPC commands are respectively mapped by −1, 0, 1, and 3.

In one embodiment, with an absolute $\delta_{SRS,b,f,c}$, TPC commands are respectively mapped by −4, −1, 1, and 4.

In one embodiment, mappings above are not limited to values of l and m.

Embodiment 9

Embodiment 9 illustrates a schematic diagram of a measurement on a first RS resource group being used for calculating a pathloss according to one embodiment of the present application, as shown in FIG. 9.

In one embodiment, the first node is provided using a default beam as a pathloss reference.

In one embodiment, the first node is not provided using a default beam as a pathloss reference.

In one embodiment, the first power meets: P=min (Pmax, Y+a*PL+f), where P identifies the first power, min( ) is the function that yields a minimum value, Pmax is a maximum transmit power, Y is a sum of other parameters, and PL is a pathloss, with a being a coefficient of the pathloss, and f is a first power adjustment state.

In one embodiment, the first power is linear with the pathloss.

In one embodiment, when a maximum transmit power is not reached, the first power is linear with the pathloss.

In one embodiment, when a minimum transmit power is not reached, the first power is linear with the pathloss.

In one embodiment, the Y includes a network-configured parameter.

In one embodiment, the Y includes a target transmit power.

In one embodiment, the Y includes a bandwidth-related parameter.

In one embodiment, the a is configured by the network.

In one embodiment, the pathloss is expressed in $PL_{b,f,c}$ $(q_d)$.

In one embodiment, the pathloss is for a carrier f in an uplink bandwidth part (BWP) b for a cell c.

In one embodiment, the pathloss is measuremed in dB.

In one embodiment, the pathloss is a downlink pathloss estimated using reference signal resources $q_d$.

In one embodiment, the pathloss is a downlink pathloss estimated according to a measurement result on reference signal resources $q_d$.

In one embodiment, a transmit power on reference signal resources $q_d$ is fixed or known.

In one embodiment, a difference between a transmit power and a receive power on reference signal resources $q_d$ is determined as the pathloss.

In one embodiment, a difference between a transmit power and a measurement result on reference signal resources $q_d$ is determined as the pathloss.

In one embodiment, a measurement result on reference signal resources $q_d$ is linear with a pathloss.

In one embodiment, the greater value of a measurement result on reference signal resources $q_d$, the smaller the pathloss.

In one embodiment, the smaller value of a measurement result on reference signal resources $q_d$, the greater the pathloss.

In one embodiment, the $q_d$ is the first RS resource group.

In one embodiment, the $q_d$ belongs to the first RS resource group.

In one embodiment, the $q_d$ is a first one in the first RS resource group.

In one embodiment, the $q_d$ is one RS resource associated with a first QCL parameter in the first RS resource group.

In one embodiment, the first RS resource group is periodic.

In one embodiment, any reference signal resource in the first RS resource group is periodic.

In one embodiment, any reference signal resource in the first RS resource group is periodically repeated in time domain.

In one embodiment, the first RS resource group is semi-persistent.

In one embodiment, an RRC signaling configuring the first RS resource group comprises a period for a first RS resource group.

In one embodiment, an RRC signaling configuring the first RS resource group comprises a period for at least one RS resource in a first RS resource group.

Embodiment 10

Embodiment 10 illustrates a structure block diagram of a processing device used in a first node according to one embodiment of the present application; as shown in FIG. 10. In FIG. 10, a processing device 1000 in the first node is comprised of a first receiver 1001 and a first transmitter 1002. In Embodiment 10, the first receiver 1001 receives a first signaling; and as a response to receiving the first signaling, resets a first power control adjustment state to 0; and the first transmitter 1002 transmits a first radio signal with a first power;

herein, the first signaling is a physical layer signaling, or the first signaling is a MAC layer signaling; the first signaling is used to indicate a first RS resource group; the first power control adjustment state is used for calculating the first power.

In one embodiment, the first receiver 1001, as a response to receiving the first signaling, performs a measurement on the first RS resource group.

In one embodiment, the first receiver 1001, as a response to receiving the first signaling, stops performing a measurement on the first RS resource group.

In one embodiment, the first receiver 1001, as a response to receiving the first signaling, performs a measurement on the first RS resource group based on a first QCL parameter;

herein, before receiving the first signaling, the measurement performed on the first RS resource group is based on a second QCL parameter.

In one embodiment, a measurement on the first RS resource group is used for calculating a pathloss.

In one embodiment, the first transmitter 1002 transmits a second signal, the second signal being used for an acknowledgement of the first signaling;

herein, the second signal is unicast; the first signaling is non-unicast.

In one embodiment, the first signaling is used to determine that a number of power control adjustment state(s) is 1; the first signaling is a physical layer signaling;

herein, before receiving the first signaling, the number of the power control adjustment state(s) is greater than 1; the number of the power control adjustment state(s) being 1 is used for resetting the first power control adjustment state to 0.

In one embodiment, the first transmitter 1002 transmits a first MAC CE as a response to receiving the first signaling; the first MAC CE is used for reporting a power headroom.

In one embodiment, the first node is a UE.

In one embodiment, the first node is a terminal supporting large delay difference.

In one embodiment, the first node is a terminal supporting NTN.

In one embodiment, the first node is an aircraft or vessel.

In one embodiment, the first node is a cellphone or vehicle-mounted terminal.

In one embodiment, the first node is a relay UE and/or a U2N remote UE.

In one embodiment, the first node is an IoT terminal or IIoT terminal.

In one embodiment, the first node is a piece of equipment supporting transmissions with low delay and high reliability.

In one embodiment, the first node is a sidelink communication node.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

Embodiment 11

Embodiment 11 illustrates a structure block diagram of a processing device used in a second node according to one embodiment of the present application; as shown in FIG. 11. In FIG. 11, a processing device 1100 in the second node is comprised of a second transmitter 1101 and a second receiver 1102. In Embodiment 11, the second transmitter 1101 transmits a first signaling;

the second receiver 1102 receives a first radio signal;

herein, the first signaling is a physical layer signaling, or the first signaling is a MAC layer signaling; the first signaling is used to indicate a first RS resource group; the first power control adjustment state is used for calculating the first power; a transmit (Tx) power of the first radio signal is a first power; the first signaling is used for triggering a reset of the first power control adjustment state to 0.

In one embodiment, a measurement on the first RS resource group is used for calculating a pathloss.

the second receiver 1102 receives a second signal, the second signal being used for an acknowledgement of the first signaling;

herein, the second signal is unicast; the first signaling is non-unicast.

In one embodiment, the first signaling is used to determine that a number of power control adjustment state(s) is 1; the first signaling is a physical layer signaling;

herein, before receiving the first signaling, the number of the power control adjustment state(s) of a receiver of the first signaling is greater than 1; the number of the power control adjustment state(s) being 1 is used for resetting the first power control adjustment state to 0.

In one embodiment, the second receiver 1102 receives a first MAC CE; the first MAC CE is used for reporting a power headroom.

In one embodiment, the second node is a satellite.

In one embodiment, the second node is a base station.

In one embodiment, the second node is a relay.

In one embodiment, the second node is an access point.

In one embodiment, the second node is a multicast-supporting node.

In one embodiment, the second transmitter 1101 comprises at least one of the antenna 420, the transmitter 418, the transmitting processor 416, the multi-antenna transmitting processor 471, the controller/processor 475 or the memory 476 in Embodiment 4.

In one embodiment, the second receiver 1102 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
a receiver receiving a first signaling, wherein before receiving the first signaling a number of power control adjustment states is greater than 1, and wherein the first signaling is used to determine that the number of power control adjustment states is 1;
a processor, in response to receiving the first signaling and determining that the number of power control adjustment states is 1, resetting a first power control adjustment state to 0;
the processor calculating a first power based on the first power control adjustment state; and
a transmitter transmitting a first radio signal using the calculated first power, wherein the first signaling is a physical layer signaling or a Medium Access Control (MAC) layer signaling, and the first signaling indicates a first Reference Signal (RS) resource group.

2. The first node according to claim 1, characterized in comprising:
the receiver, in response to receiving the first signaling, performing a measurement on the first RS resource group.

3. The first node according to claim 2, characterized in that a measurement on the first RS resource group is used for calculating a pathloss.

4. The first node according to claim 1, characterized in comprising:
the receiver, in response to receiving the first signaling, stopping performing a measurement on the first RS resource group.

5. The first node according to claim 4, characterized in that a measurement on the first RS resource group is used for calculating a pathloss.

6. The first node according to claim 1, characterized in comprising:
the receiver, in response to receiving the first signaling, performing a measurement on the first RS resource group based on a first Quasi Co-Location (QCL) parameter, wherein before receiving the first signaling, measurement performed on the first RS resource group is based on a second QCL parameter.

7. The first node according to claim 6, characterized in that a measurement on the first RS resource group is used for calculating a pathloss.

8. The first node according to claim 1, characterized in that a measurement on the first RS resource group is used for calculating a pathloss.

9. The first node according to claim 1, characterized in comprising:
the transmitter transmitting a second signal, the second signal being used for an acknowledgement of the first signaling, wherein the second signal is unicast and the first signaling is non-unicast.

10. The first node according to claim 1, characterized in comprising:
the transmitter, in response to receiving the first signaling, transmitting a first MAC Control Element (CE), wherein the first MAC CE is used for reporting a power headroom.

11. The first node according to claim 1, characterized in that the first RS resource group comprises at least two RS resources.

12. The first node according to claim 1, characterized in that the first signaling comprises a first field, the first field indicating an activation or usage of at least one reference signal resource, or, the first field indicating a deactivation or suspense of at least one reference signal resource.

13. The first node according to claim 1, characterized in that the first node, in response to receiving the first signaling, performing a measurement on the first RS resource group based on a first QCL parameter, wherein before the first node receives the first signaling, the measurement performed on the first RS resource group is based on a second QCL parameter.

14. A method in a first node for wireless communications, comprising:

receiving a first signaling, wherein before receiving the first signaling a number of power control adjustment states is greater than 1, and wherein the first signaling is used to determine that the number of power control adjustment states is 1;

in response to receiving the first signaling and determining that the number of power control adjustment states is 1, resetting a first power control adjustment state to 0;

calculating a first power based on the first power control adjustment state; and transmitting a first radio signal using the calculated first power, wherein the first signaling is a physical layer signaling or a Medium Access Control (MAC) layer signaling, and the first signaling indicates a first Reference Signal (RS) resource group.

15. The method according to claim 14, characterized in comprising:

in response to receiving the first signaling, performing a measurement on the first RS resource group.

16. The method according to claim 14, characterized in comprising:

in response to receiving the first signaling, stopping performing a measurement on the first RS resource group.

17. The method according to claim 14, characterized in comprising:

in response to receiving the first signaling, performing a measurement on the first RS resource group based on a first Quasi Co-Location (QCL) parameter, wherein before receiving the first signaling, measurement performed on the first RS resource group is based on a second QCL parameter.

18. The method according to claim 14, characterized in that a measurement on the first RS resource group is used for calculating a pathloss.

19. The method according to claim 14, characterized in comprising:

transmitting a second signal, the second signal being used for an acknowledgement of the first signaling, wherein the second signal is unicast and the first signaling is non-unicast.

20. The method according to claim 14, characterized in comprising:

in response to receiving the first signaling, transmitting a first MAC Control Element (CE), wherein the first MAC CE is used for reporting a power headroom.

\* \* \* \* \*